US005663477A

United States Patent [19]

Honeycutt

[11] Patent Number: 5,663,477

[45] Date of Patent: Sep. 2, 1997

[54] HYDROCARBON DISPOSAL METHOD

[75] Inventor: Travis W. Honeycutt, Gainesville, Ga.

[73] Assignee: Isolyser Company, Inc., Norcross, Ga.

[21] Appl. No.: 802,083

[22] Filed: Dec. 3, 1991

[51] Int. Cl.[6] .................................. A62D 3/00; B09B 3/00

[52] U.S. Cl. .......................... 588/205; 210/925; 252/312; 252/315.1; 405/128; 405/129; 588/255

[58] Field of Search ..................... 44/271, 301; 252/312, 252/315.1; 264/4.3, 4.33, 4.7; 588/205, 255; 405/128, 129; 210/925

[56] References Cited

U.S. PATENT DOCUMENTS

| | | | |
|---|---|---|---|
| 2,443,378 | 6/1948 | Dittmar et al. | 44/271 |
| 3,666,430 | 5/1972 | Osmond et al. | 44/271 |
| 3,679,382 | 7/1972 | Cohrs et al. | 44/271 |
| 3,881,295 | 5/1975 | Derby | 588/255 |
| 4,443,576 | 4/1984 | Bhattacharyya et al. | 524/522 |
| 4,497,663 | 2/1985 | Fisher et al. | 134/4 |
| 4,778,880 | 10/1988 | Symes et al. | 536/43 |
| 4,812,242 | 3/1989 | James et al. | 210/925 X |
| 4,931,192 | 6/1990 | Covington et al. | 405/129 X |

*Primary Examiner*—Richard D. Lovering
*Attorney, Agent, or Firm*—Needle & Rosenberg

[57] ABSTRACT

A method for the disposal of a hydrocarbon. The hydrocarbon is intimately mixed with an aqueous solution. The aqueous solution includes a hydrophilic monomer, a cross-linking agent and an emulsifier. The emulsion is then solidified for disposal through the addition of reduction/oxidation catalyst.

8 Claims, No Drawings

HYDROCARBON DISPOSAL METHOD

TECHNICAL FIELD OF THE INVENTION

The present invention involves disposal methods for hydrocarbons. Toxic hydrocarbons such as benzene, toluene and xylene represent formidable disposal obstacles. The present invention involves the production of an emulsion which can be solidified to contain such toxic hydrocarbons for solid waste disposal.

BACKGROUND OF THE INVENTION

Toxic hydrocarbons such as benzene, toluene and xylene are used in a number of environments as solvents. For example, in the pathology departments of hospitals, such aromatic hydrocarbons are used as solvents to strip away residual paraffin wax from tissue samples that have been solidified and subsequently thin-layered with a microtome. Paraffin is used by the laboratories to stabilize specimens prior to thin layering the samples. These solvents, once dirty or contaminated, must be disposed. Disposal problems are numerous in that such solvents exhibit high vapor pressure and are thus flammable. In addition, they cannot be land-filled because they are listed as EPA pollutants and they cannot be introduced into the sewer system because they are insoluble in water and are potentially toxic carcinogens. Lastly, such solvents are potentially explosive and trace amounts of these materials have been associated with mammalian cell changes.

It is thus an object of the present invention to provide a method of conveniently disposing of toxic solvents.

It is yet a further object of the present invention to provide a means of disposing of toxic solvents as a solid block of plastic material capable of either being appropriate for landfill deposit or, alternatively, incineration.

These and further objects will be more readily apparent when considering the following disclosure and appended claims.

SUMMARY OF THE INVENTION

The present invention comprises a method for the disposal of a hydrocarbon which begins by adding the hydrocarbon to aqueous solution. The aqueous solution includes a hydrophilic monomer, a cross-linking agent and an emulsifier. These ingredients are intimately mixed by, for example, vigorous shaking. Upon vigorous shaking, the hydrophilic monomer is polymerized with the cross-linking agent to form an emulsion. This oil in water emulsion can then be solidified through the addition of a reduction/oxidation catalyst.

The solid polymer block produced by the present method represents a convenient disposal vehicle for the noted hydrocarbon solvents.

DETAILED DESCRIPTION OF THE INVENTION

Emulsions have been in general use by the chemical industry for several decades. They are primarily used as a vehicle for providing a pourable mixture of a high polymer in an aqueous matrix. If one were to polymerize a liquid monomer to produce a high molecular weight solid polymer, generally it is then very difficult to dissolute the high polymer into a solvent because these reactions tend to produce a difficult-to-solubilize material. On the other hand, if the polymerization reaction is carried out in a solution, the polymer usually produces a highly viscous solution that is not pourable or precipitates from solution into a thick sub-layer which is not easy to handle or useful.

Normal emulsion polymerization processes are generally carried out by introducing an emulsifier or surfactant (nonionic, anionic or cationic) into a hydrophobic monomer; for example methyl methacrylate and, along with other various additives, the emulsifier/monomer solution is mixed with water under high shear to produce a white milky-like emulsion. With continued stirring, a reduction/oxidation catalyst is introduced to cause free radical polymerization over a period of several hours. This same reaction process can be carried out using a condensation polymerization method as would be used with nylon or polyester co-monomers. However, the emulsion polymerization method is generally used for addition-type monomers such as the acrylates.

The intent of emulsion polymerization is to manufacture a high molecular weight polymer with a linear or branched structure such as may be used to prepare an active ingredient (resin) in, for example, paints, roofings or coatings. At the end of the reaction, the viscosity of the emulsion is still very fluid in that the mixture is still pourable-because there are microscopic micelles of hydrophobic polymer that are surrounded by an aqueous phase. The early paint innovations by DuPont and others that led to the development of non-run latex paints were of the emulsion variety. Earlier, oil-based paint formulations were of the solution type.

By contrast, the emulsion of the present invention is prepared by combining a hydrophilic (with or without a hydrophobic) monomer, cross-linker, and emulsifier with water and other additives as part "A". Part "B" then becomes the hydrocarbon to be disposed. In the hospital, "B" typically is toluene, xylene or benzene. When "B" is shaken vigorously with "A" it becomes a white, thin milky-like emulsion. When approximately 50–70 parts of "A" are mixed with 50–30 parts of "B", an "oil-in-water" emulsion is formed. Once this mix is polyymerized, because of the cross-linker, it is simultaneously solidified utilizing a reduction/oxidation catalyst; it becomes a non-flowing solid due to the cross-linking agent in the emulsion. The crosslinker, such as methylene bisacrylamide produces a three dimensional polymer matrix which is solid. This present process is, in effect, a hybrid as it combines the features of the old oil-in-water emulsion technology with features of the new, emulsion polymerization technology. In this case, however, the monomer is principally hydrophilic and which results in an improved means of handling and disposing of small quantities of hydrocarbons.

Uniquely, the percent emulsion is cross-linked to produce a solid non-flowing block of white solid rubber-like material as opposed to a pourable mixture, which is the intent of an ordinary emulsion process. This is accomplished by the inclusion of a monomer that has two reactive sites (double bonds) that uniquely cross-links to the emulsion as the polymerization reaction proceeds. This process combines the features of an oil-in-water emulsion with those of an emulsion polymerization plus a cross-linking monomer to produce a solid. The monomer, in this case, is principally a water-soluble monomer and is present in the water soluble phase.

The present formulary emulsifies hydrocarbon solvents such as benzene, toluene, xylene, and other derivations as they are admixed and vigorously shaken with the aqueous phase containing the monomers and the cross-linker, and, unusually, the emulsifier for the hydrocarbon. Normally, the emulsifier would be included in with the hydrocarbons. For convenience purposes, the end user would simply add the hydrocarbon to the water/monomer (and cross-linker)/ emulsifier solution.

EXAMPLE 1

| Part A: Monomer/Emulsifier Solution | | |
|---|---|---|
| Ingredient | Grams | Percent |
| Water | 58.41 | 29.06 |
| EDTA (ethylenediamine tetra acetic acid) | 0.05 | 0.25 |
| TSP (trisodium phosphate) | 0.05 | 0.25 |
| Soda Ash | 0.05 | 0.25 |
| Antifoam 1410 (silicone defoamer offered by Dow Corning) | 0.05 | 0.25 |
| Methylene.bis.acrylamide (MBA) | 0.10 | 0.05 |
| 4-Methoxyphenol (4-MP) | 0.004 | 0.002 |
| N-Methylolacrylamide (NMA) | 17.00 | 8.46 |
| Acrylamide | 17.00 | 8.46 |
| AMPS 2405 (Lubrizol) | 7.00 | 3.48 |
| Neodol 91.8 (a primary alcohol offered by Shell) | 1.00 | 0.50 |
| LpH se (Calgon Vistal) | 0.27 | 0.13 |
| Part B: Hydrocarbon | | |
| Xylene | 100.00 | 49.76 |
| Total | 200.984 | 100.002 |

Part B is added to Part A with vigorous shaking to form a milky white, thin emulsion.

To this reactive mixture is added 0.25 g each of the catalysts ammonium persulfate (an oxidizing agent), and zinc formaldehyde sulfoxylate (a reducing agent). These catalysts cause the monomer in the aqueous phase to commence a free radical reaction which causes the monomers to polymerize into a high molecular weight polymer. Simultaneously, methylene bisacrylamide cross-links the polymer forming a rigid emulsion structure which is unique. This emulsion structure now "locks in" the solvent as hydrocarbon micelles. The cross-linking of the emulsion with MBA results in the emulsion matrix forming a solid.

EXAMPLE 2

AMPS 2405 in Example 1 replaced with methacrylic acid with similar results.

The solid emulsion phase is approximately 50% disposed solvent and 50% aqueous phase (and cross-linked polymer). This process dramatically reduces odor and the flammability of the solvent. For example, liquid xylene solvent is explosive on the order of normal gasoline whereas the solid emulsion material will barely support combustion with an orange to black flame. This "weak" flame is easily extinguished with one's breath. Combustion was seldom achieved when an attempt was made to ignite a cup of this material. More often than not, the match would extinguish as it was introduced into the cup of the product. The ratio of aqueous phase and polymer to the solvent phase is most often approximately 50—50 with a more desirous combination of 70% aqueous phase to 30% solvent, to ensure "oil in water" micelle formation.

EXAMPLE 3

Xylene was replaced with toluene with similar results as in Example 1.

It is most appropriate that the hydrocarbon solvent be trapped in the micelles and be suspended in the solid aqueous emulsion phase. If the ratio is more near 50—50, it is likely that the emulsion will be a "water in oil" phase which is contra-indicated in this new process. In this ratio it is more likely that the solvent vapor phase will be higher, and the system will be potentially more flammable.

Once the solid emulsion phase is formed, this product is more easily transported, contained, and meets stringent OSHA handling requirements. If the product cannot be landfilled due to local or regional regulations, then it can be incinerated in an ordinary solid waste incinerator without undue fear of rapid ignition or explosion. The product burns very slowly due to the nature of the solid as the water based emulsion tends to modulate or control the combustion rate of the hydrocarbon.

This product could be supplied to the medical and industrial end user in a container that contains the monomer, emulsifier, cross-linker, water and stabilizers. Into this container would be introduced, on a daily, or more often, basis, the spent hydrocarbons, such as benzene, toluene and xylene, or mixtures and derivatives. Vigorous shaking is required to form an emulsion each time the hydrocarbons are added. Once the container is full, the catalyst (ammonium persulfate and zinc formaldehyde sulfoxylate) are added to cause the polymerization reaction. This, in turn, causes the emulsion to proceed to a solid. The container can now be safely disposed in solid waste incinerators.

I claim:

1. A method for the disposal of a hydrocarbon comprising adding the hydrocarbon to an aqueous solution, said aqueous solution comprising a hydrophilic monomer having at least two reactive sites, a cross-linking agent and an emulsifier, intimately mixing said hydrocarbon and aqueous solution to polymerize said hydrophilic monomer with said cross-linking agent to form an oil-in-water emulsion which is then solidified through the addition of a reduction/oxidation catalyst, said solidified emulsion then being disposed of by landfill disposal or by incineration.

2. The method of claim 1 wherein said hydrocarbon comprises a member selected from the group consisting of toluene, xylene and benzene.

3. The method of claim 1 wherein said hydrocarbon comprises approximately 30 to 50% by weight of said emulsion.

4. The method of claim 1 wherein said cross-linking agent comprises methylene bisacrylamide.

5. The method of claim 1 wherein said catalyst comprises a member selected from the group consisting of ammonium persulfate and zinc formaldehyde sulfoxylate and mixtures thereof.

6. The method of claim 1 wherein said mixing step comprises vigorous shaking of said aqueous solution and hydrocarbon to form an oil in water emulsion.

7. The method of claim 1 wherein said solidified emulsion is incinerated.

8. The method of claim 1 wherein said solidified emulsion is buried in a landfill disposal site.

* * * * *